Dec. 22, 1942.     G. HANSEN     2,305,775
SCALE READING APPARATUS FOR ROTATABLE MIRROR DEVICES
Filed Sept. 5, 1939
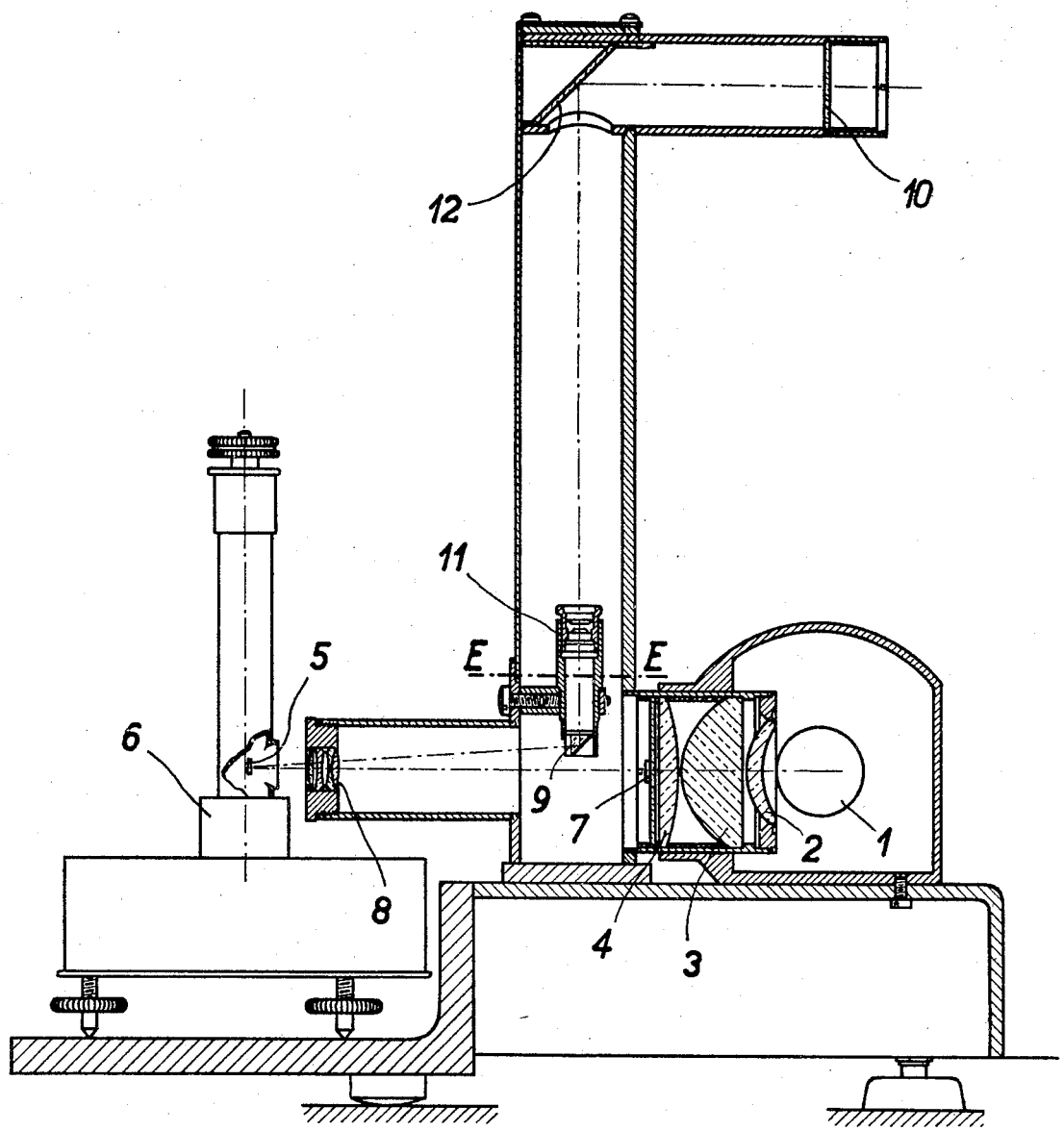
Inventor:
Gerhard Hansen.

Patented Dec. 22, 1942

2,305,775

UNITED STATES PATENT OFFICE 2,305,775

SCALE READING APPARATUS FOR ROTATABLE MIRROR DEVICES

Gerhard Hansen, Jena, Germany; vested in the Alien Property Custodian

Application September 5, 1939, Serial No. 293,462
In Germany September 12, 1938

2 Claims. (Cl. 88—24)

The data obtained in measuring technics are indicated in most cases by a galvanometer, the deflections of which are a measure for the magnitudes in question. The instrument of this kind which is oldest and most widely used in scientific research work is that of the Gauss-Poggendorff type. This instrument has a mirror and a comparatively long scale, which is viewed by means of a telescope beneath it and illuminated over its entire length, the field of view of the telescope containing a line mark and receiving an image of that part of the scale which corresponds to the position of the mirror. If the Gauss-Poggendorff instrument is not however practical for technical apparatus, this is due to the great distance between the galvanometer and the reading-off device and to the additional disadvantage of the observer being compelled to read on the scale through an eye-piece. Another known construction, in which a stationary projector produces on a long scale the image of a luminous index appearing in the galvanometer mirror is not very advantageous either, especially because the observer's eye must needs follow the long way of this index.

The demands to be made on a galvanometer apparatus for technical use, and which, so far, have not been fulfilled at least concurrently in one and the same instrument, are, therefore, as follows:

1. Great relative accuracy or, in other words, utilisation of an image angle of approximately 20° which corresponds to an angle of rotation of the mirror of 10°, and the reading-off on a scale having as many division lines as permit a complete utilisation of the relative accuracy to be obtained optically by the size and the rotation of the mirror.

2. Instead of being compelled to view with one eye through an eye-piece, the observer is to be in a position to see the image with both eyes on a ground glass plate, so that his head need not assume any definite and perhaps uncomfortable position.

3. The eye of the observer is not to be required to follow a luminous index on a long scale, the observer's attention having to be directed permanently to one and the same place in the instrument.

4. The distance apart of the galvanometer and the reading-off device is not to be considerably greater than the other dimensions of the instrument.

According to the present invention, the above-mentioned demands are fulfilled concurrently by one instrument. In this instrument a convergent optical system and the rotatable mirror produce a real image of a scale in approximately natural size, and another convergent system magnifies this image and projects it on a ground plate having a reading mark. In contradistinction to the instruments referred to above, in which use is made of a scale approximately one metre in length and comprising 1000 division lines, the instrument according to the invention permits the use of a scale which is reduced in size to one tenth, namely a scale that is 100 millimetres long and whose division lines are 0.1 millimetre apart. If, according to the invention, also the distance between the galvanometer and the scale is reduced to one tenth, so as to be in keeping with the reduction in size of the scale, the scale ends again correspond to the extreme positions of the rotatable mirror. As the scale is no longer than 100 millimetres in this case, it is possible to provide close to the rear thereof a condensing lens which projects the incandescent body of an electric lamp through the scale on the rotatable mirror. Instead of being now made to appear on a ground glass plate, this scale image is used for reading-off only subsequently to having been magnified by a third convergent system. This third system produces the said image on a ground glass plate having a reading mark. As the scale to be imaged can easily be illuminated sufficiently and in a uniform manner on account of its reduced length, the projection of the scale image can be magnified 10 to 15 times without the results of the reading-off being impaired.

The convergent optical system in front of the galvanometer mirror is conveniently retraversed by the imaging rays, subsequently to these rays having been reflected by the rotatable mirror, so that the real scale image produced by this convergent system is close to the scale.

The accompanying drawing shows in sectional elevation a constructional example of an instrument embodying the invention.

In the drawing, I is an incandescent lamp which is imaged on the revolving mirror 5 of a mirror galvanometer 6 by means of a condensing system having a great aperture and consisting of three lenses 2, 3 and 4. In close proximity to this condensing system is disposed a scale 7, which is uniformly illuminated throughout. By another lens system 8, the scale 7 is imaged in the plane E—E with approximating unit magnification. When the scale is being imaged, the lens system is retraversed by the imaging rays, subsequently to these rays having been reflected by the rotatable mirror 5. The imaging of the scale in the plane E—E is due to the imaging rays being totally reflected by a prism 9. By means of an objective 11 having a small focal length and a great ratio of aperture, the scale image in the plane E—E is imaged fifteen times as great for the reading-off on a ground glass plate 10, the ray path being deflected at right angles by a mirror 12.

I claim:

1. In an optical system for indicating the angular deflection of the mirror of a mirror galvanometer, a light source, a condenser lens system, a screen, a reading mark on said screen, a scale on the side of the said condenser lens system toward said mirror, a convergent lens system arranged in axial alignment with the light beam from the said light source to focus an image of the said scale in an intercepting plane with about unity ratio, and a second convergent lens system arranged in axial alignment with the light beam between said plane and said screen to focus upon said screen an enlarged image of the central part of said scale image.

2. In an optical system for indicating the angular deflection of the mirror of a mirror galvanometer, a light source, a condenser lens system, a screen, a reading mark on said screen, a convergent lens system between said condenser lens system and said mirror rotatable about an axis parallel to its surface, a scale arranged in the focus of said convergent lens system on the side of said condenser lens system toward said mirror, said condenser lens system and said convergent lens system arranged to focus an image of said light source upon said mirror, said convergent lens system arranged to be transversed by the imaging rays from said scale and retraversed subsequently to reflection from said mirror to focus an image of said scale in an intercepting plane with about unity ratio, a second convergent lens system between said first convergent lens system and said screen and in axial alignment with the light beam from said light source to focus upon said screen an enlarged image of the centrap part of the image of said scale formed by the said twice transversed first convergent lens system.

GERHARD HANSEN.